INVENTORS,
NICHOLAS V. ROSS,
JOHN A. LOGAN
BY
J. H. SLOUGH
ATTORNEY

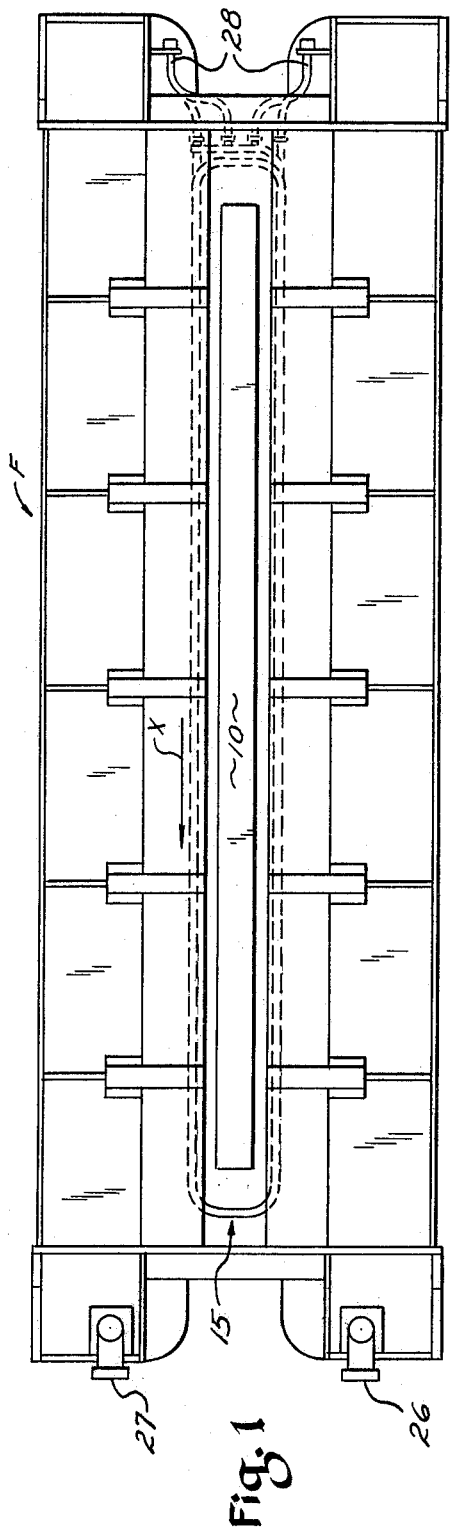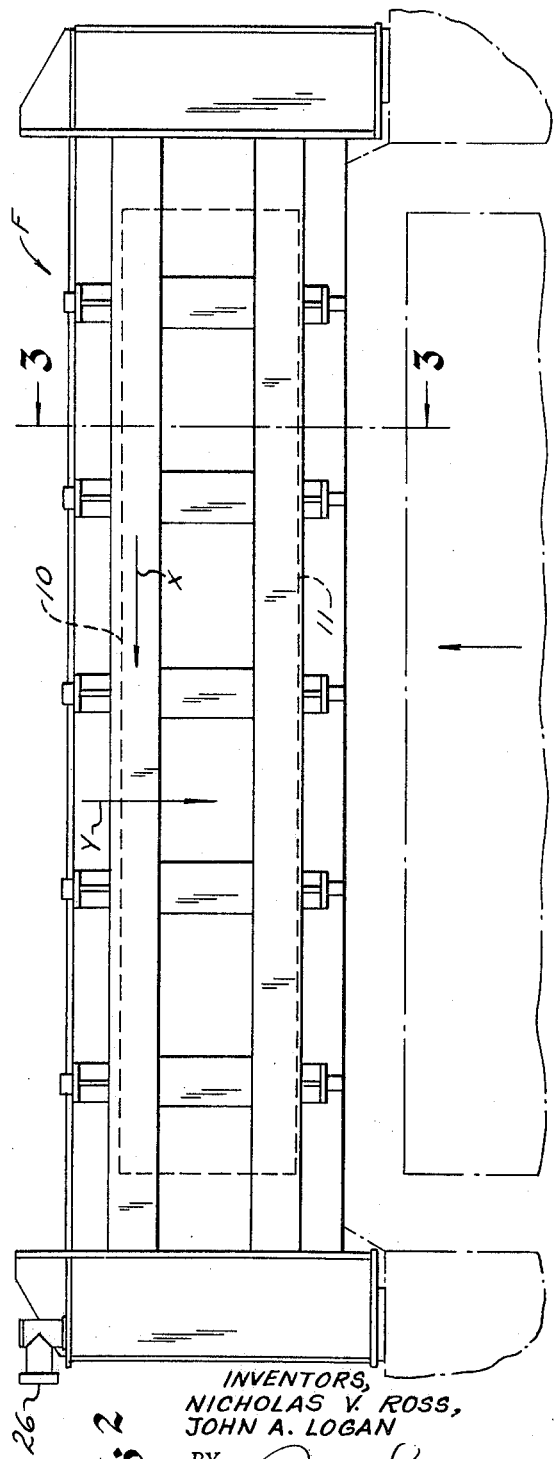

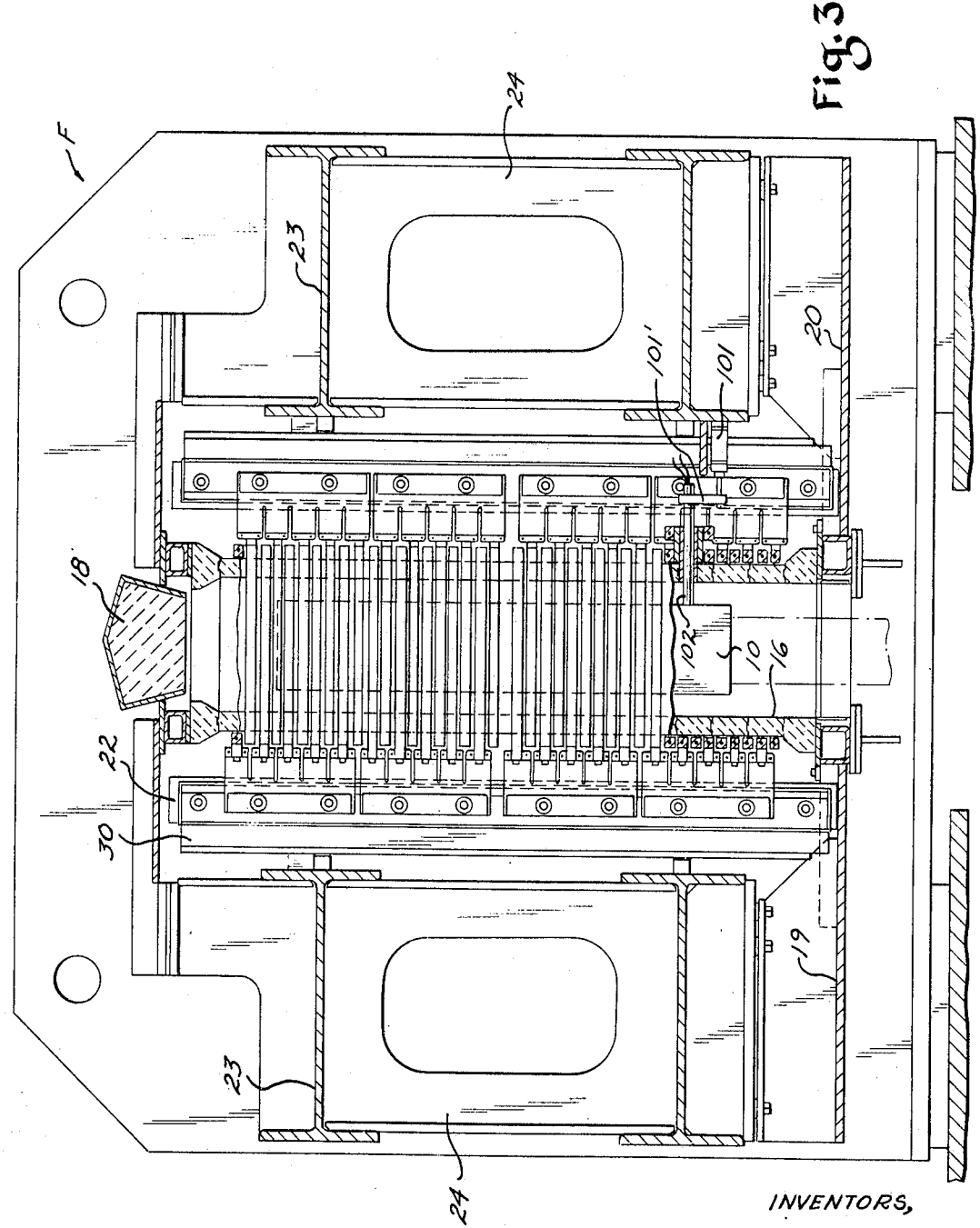

INVENTORS,
NICHOLAS V. ROSS,
JOHN A. LOGAN
BY
J. H. SLOUGH
ATTORNEY

United States Patent Office 3,485,985
Patented Dec. 23, 1969

3,485,985
APPARATUS FOR INDUCTION
HEATING OF SLABS
Nicholas V. Ross and John A. Logan, Youngstown, Ohio, assignors to Ajax Magnethermic Corporation, Warren, Ohio, a corporation of Ohio
Filed Sept. 25, 1967, Ser. No. 670,027
Int. Cl. H05b 5/00, 9/06
U.S. Cl. 219—10.67                                      7 Claims

ABSTRACT OF THE DISCLOSURE

Inductive sequential heating of metal slabs in a plurality of low frequency heater units, wherein means are provided for simultaneously positioning a slab on edge in each of the heater units, means are provided for simultaneously energizing each of the said heaters to statically heat each slab positioned therein, control means are provided for simultaneously transferring the slabs on edge from one to another of said heaters, each slab being sequentially heated in the separate heaters to a final selected temperature.

---

This invention relates to induction heating and relates more particularly to induction heating means wherein continuous heating of a plurality of relatively large size metal slabs in a minimum of time in spaced coil heaters and transference of said slabs to different of said heaters is effected, said slabs successively being delivered to the mill upon demand of the mill.

It has particular application to the continuous heating of cast steel slabs, the slabs being received either "cold" from storage or direct from continuous casting equipment with retained heat, and the temperature of said slabs is raised progressively in the said heaters of the invention to a predetermined final uniform rolling temperature, the slabs being adapted to be selected and delivered upon demand by a rolling mill.

Induction slab heating in the past has generally comprised placing induction coils helically wound around the slab and moving the slab continuously through such coil. Such heating has serious disadvantages, continuous operation is required, mill delays result in unfavorable temperature conditions, clearances are critical and numerous problems are presented which are complex and costly.

This invention comprises the inductive heating of a "static" load, a metal slab or the like, and the term "static" is used to designate the immovability of the load during heating in the various spaced induction heaters in which the load is successively placed. The said slab is heated according to the invention to different predetermined surface to center differential temperatures, the load being brought to relatively highest maximum surface temperature and with relatively least temperature differential in the final heater. After removal of the slab from the final heater, the said differential rapidly disappears and equalization of temperatures takes place while the slab is in transit to the mill. The slab is preferably placed on edge and heated in induction heating means of the type described and claimed in application for U.S. Letters Patent Ser. No. 589,974 filed Oct. 27, 1966, now Patent 3,424,886, and as described and claimed in co-pending application for U.S. Letters Patent Ser. No. 670,046 filed Sept. 25, 1967, in which the conductor has its longitudinal axis disposed in a direction parallel to the longitudinal axis of the load disposed in said inductor, the magnetic field being substantially disposed at right angles to the longitudinal axis of the load; in such constructions, the slab is placed on edge and the coil wrapped about its longest dimension. Each slab is preferably supported by support means disposed below each heater and hoisted or otherwise raised into spaced vertical disposition within each coil for heating, then lowered and transferred to a successive heater or after heating to the final desired temperature in the final heater to discharge means. The preferred support means illustrated herein is described and claimed in co-pending application Ser. No. 670,028, filed Sept. 25, 1967 and assigned to the assignee of the present invention.

The stage induction heaters in the application illustrated herein are aligned side by side to form a single heater line and transfer means simultaneously move a plurality of said slabs through the line. When the mill signals for a slab, the slabs in each heater are preferably lowered to the transfer means, moved ahead to the next position, the slab in the final heater is moved to the mill discharge conveyor and the following heated slabs aligned with the next successive heater, a slab previously drawn from storage or casting equipment is aligned with the first of said heaters simultaneously with the discharge of the last of said plurality of slabs and the alignment of the other of said heated slabs with a following heater; said slabs are then preferably simultaneously raised into the adjacent heaters for a further heating cycle. In the installation refered to, the transfer means travels back to load position for loading of the "cold" or relatively cold slab during the heating cycle. A plurality of said heating lines ensures a continuous supply of slabs at rolling temperatures. In a particular installation according to the invention, six such lines can produce a slab heated to rolling condition every three minutes or twenty per hour.

A principal object of the invention is to provide plural induction means which will heat metal slabs or the like in successive stages to predetermined desired final slab temperature, said slabs being supported in fixed position during heating in each of said heaters.

A still further object of the invention is to provide plural inductive heating means which in a minimum of time will heat the "static" slabs, or the like, to a final desired temperature and in which the heating and transfer time from one heater to another is at a minimum.

Yet another object of the invention is to provide improved induction heating means for simultaneously heating slabs or the like, with a uniform heating pattern over the entire slab.

Another object of the invention is to provide induction heating means for simultaneously heating a slab or the like in each of separate predetermined stages by separate induction means to achieve selected different temperature patterns in the slabs in each of the different heating stages, patterns being uniform over the said entire slab.

A further object of the invention is to provide a plurality of induction heaters for heating a plurality of identical slabs or the like in identical times and with the same transfer time from one induction heater to another.

A still further object of the invention is to provide improved means for attaining a preselected maximum peak temperature of the slab or the like in the final stage induction heating means.

A further object of the invention is to provide maximum utilization of the connected power by each of the induction heaters and maximum electrical efficiency thereof.

A still further object of the invention is to provide power means for stage induction heating of metal slabs, etc., the said power means at each stage being operable at selected different levels; each of said successive induction means being operable at selectively reduced power levels, said slabs being heated to successively higher temperatures at each stage of the heating and with substantial equalization of the temperatures of the slab in its final stage.

Still another object of the invention is the provision of improved means for automatically heating the charges in a plurality of heaters of different predetermined temperatures, the heating cycles coinciding wherefor the charges may be transferred simultaneously from said different heaters.

A further object of the invention is to provide improved means for delivering and holding slabs or the like at or for any set interval as directed by mill demand and with the necessary accommodations due to various mill conditions, e.g. delay, roll changes, and the like.

A further object of the invention is the provision of improved means for stage-heating the slabs, whether at ambient or other heating temperatures, such as casting temperatures, and heating the same to rolling temperatures.

A further object of the invention is to provide a slab stage heating operation readily adapted for automation and computer control.

A still further object of the invention is to utilize low frequency induction heating means for stage heating relatively large slabs of metal or the like.

Other objects of the invention are to provide improved means for inductively heating relatively large slabs or the like of metal at economical frequencies with improved temperature control, with maximum efficiency, reduction of costs in processing, and a speed up of through-time and with improvements in the metal being heated.

Still further objects of the invention itself will become more readily apparent from a purview of the appended description, in which reference is made to the accompanying drawings, in which drawings:

FIGURE 1 is a top plan view of one of the improved inductor heaters of my invention;

FIGURE 2 is a side plan view of the supporting frame structure for one of the heaters of my invention;

FIGURE 3 is a sectional view taken generally from the line 3—3 of FIGURE 2;

Figure 4A:
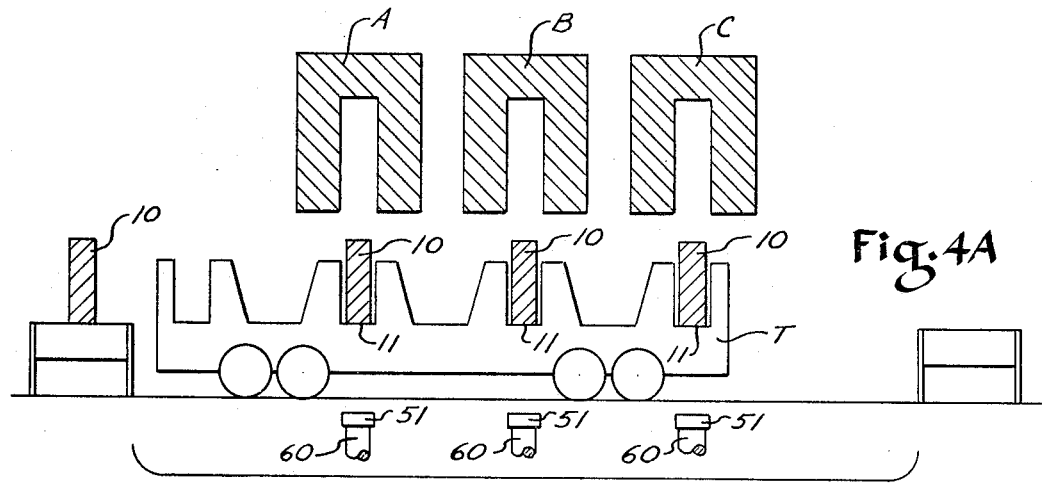
FIGURE 4A, 4B and 4C are semi-diagrammatic views of the heater components of the static load stage heater of my invention, said views illustrating the sequential movement of the slabs through aligned induction heaters from a receiving to a discharge area.

Referring now to the drawings, in all of which like parts are designated by like reference characters, the invention as illustrated is adapted for slab heating but is not restricted thereto, and the separate induction heaters utilized herein are low frequency induction heaters of the type set forth, described and claimed in co-pending application of the present inventor, Ser. No. 589,974 filed Oct. 27, 1966, now Patent No. 3,424,886 and copending applications Ser. No. 670,046 filed Sept. 25, 1967 and Ser. No. 670,028 filed Sept. 25, 1967, assigned to the assignee of the present invention. Reference to such disclosures for clarification of the structure will be made. The inductors are generally indicated at 15, the slabs at 10, the power connections of each induction coil located at one end of the coil indicated at 28, 28 and the inductor cooling inlet and outlet means located at an opposite end of the coil at 26, 27, respectively. The inductor 15 disclosed herein is a water cooled coil of rectangular form. The inductor coil mounting comprises a heavy structural frame F which completely surrounds the inductor and upon which magnetic yokes carrying frame members 30 are carried; such frame members 30 in turn are secured to separate coil conductor windings, as shown in FIGURE 3. The inductor 15 is provided with a refractory lining 16 of insulating refractory material or other preferred material.

It will be noted that in the form shown the coil 15 is disposed with respect to the slab or other metallic work piece in a direction whereby heating current is supplied from end to end of the work piece or load passing therethrough (see FIGURE 2), the direction of the current being shown by arrow $x$. The direction of the magnetic field is shown by arrow $y$ at substantial right angles to the longitudinal axis of the work piece 10.

Figure 4B:
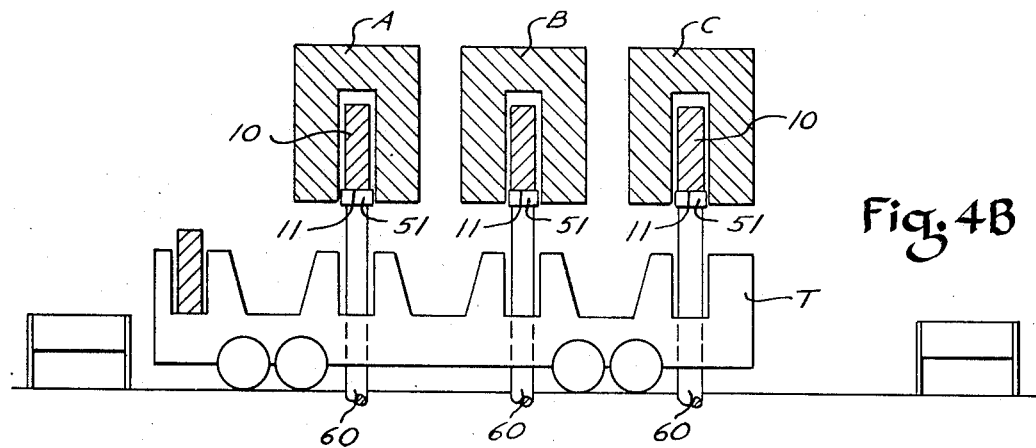
Figure 4C:
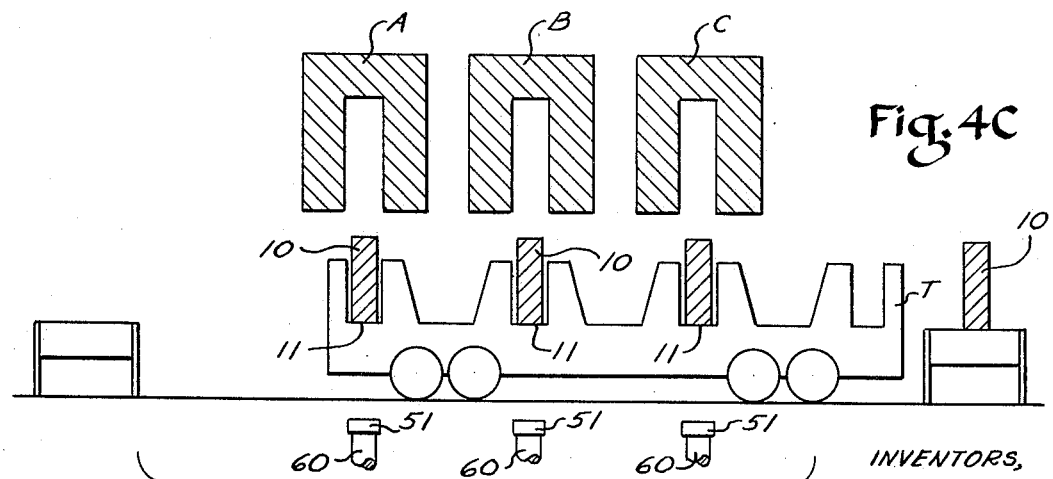

The induction heaters of the invention are arranged as shown in FIGURES 4A, 4B, 4C in parallel spaced relation; three of such heaters A, B, C, are disclosed arranged to form a heating line, the slabs being moved by conveyor or other transfer means, such as a car with appropriate slab holders, as indicated at T in FIGURES 4A, 4B, 4C into alignment with the heaters, whereupon the slabs are raised vertically by hoist means, shown at 60, and disposed on a support or lift beam into its aligned heater. The slab as illustrated has its bottom edge 11 seated on an insulated plate 51, carried by the hoist. Suitable other transfer, clamping or supporting means may be employed for raising or lowering each slab into a sleected position within each heater. Since it is desired that a variety of size slabs be heated in the inductors of the stage heater of this invention, manual or automatic detecting and control means shown schematically at 56 in FIGURE 5 may be provided for ascertaining the size of the slab or the like, its height, etc., in advance of its placement in the inductors and a signal supplied to the said heaters for suitably energizing the heaters.

The slab, it will be noted from a purview of FIGURE 3, is adapted to be supported in spaced position above the bottom windings of the coil, spaced beneath the top coil windings and spaced inwardly from the coil wherefor the slab is held enveloped in spaced relation within the coil. The coil is internally insulated from the slab by the refractory lining 16 as shown in FIGURES 3 and 4, and such lining is preferably alumina spall-resistant refractory pre-fabricated tiles or bricks fitted with tongue and groove joints as shown, and locked in the coil by any preferred manner. The bricks are preferably insulated to permit easy removal and replacement. The bottom and top of said coil is perferably covered during heating by removable insulating cover 18 and refractory bottom shield means indicated at 19 and 20. Each turn of the longitudinally disposed coil is preferably insulated from the other and an epoxy wrap is generally used for such purpose. Between the coil and structural heater frame, generally formed of heavy sheet metal are mounted magnetic steel yokes 22 which serve as paths for the magnetic flux on the outside of the coil and keep the flux out of the structure shown in FIGURES 1, 2, and 3, formed of I-beams and plate members, as for example, 23, 24. As shown in FIGURE 3, temperature control means, such as a proximity type thermocouple 102 is used to control the temperature of the slabs being heated, said thermocouple being inserted through the coil and lining and contacting the slab surface during heating to ascertain the temperature thereof. The thermocouple is mounted on an air cylinder 101 by bracket means 101' and is retracted while the slab is raised or lowered in the heater and positioned against the slab before power is turned on. One thermocouple 102 is connected to a temperature recording and controlling instrument 40 controlling power to the coil and a second thermocouple is preferably wired to a high limit indicating temperature instrument (not shown) which will operate in the event of failure to either the first thermocouple or its associated instrument. Two thermocouples are preferably used on each heater and arranged so that a temperature difference between the two thermocouples greater than a preset number of degrees will cause an alarm indicating that one of them is defective. The thermocouples are independently operated by air cylinders 101.

The inductors as used in the stage heating concept of this invention are identically constructed, as shown in FIGURE 3, wherefor such units are interchangeable; they are further, as described hereinbefore, adapted to heat slabs of various widths. Remote sensing and control means as previously indicated preferably sense the width of each slab prior to its insertion into each inductor of the line heaters and ensure a match of coil height and slab dimension. It will be noted that the commonly termed "width" of the slab becomes its slab height when the slab is placed in the heater since the slab is disposed on edge within the inductors.

In the form of the invention illustrated herein three inductors A, B, and C are shown disposed in spaced parallel alignment and to achieve maximum utilization of the connected power at each coil, the first heater A has the highest kilowatt rating, the second heater B generally half the rated power of the first heater and the third heater C generally half the rated power of the second and one-fourth the rated power of the first. Various ratios could be established but successive reduction of power in the successive heaters of each slab heating cycle is preferred. Since the invention particularly is adapted for progressively receiving relatively large slabs either in "cold" condition, for example, at ambient temperatures, or direct from casting equipment, particularly continuous casting equipment, at substantially casting temperatures, or less, provision is made for receiving either such "cold" slabs or slabs with retained heat and the first heater A has maximum power and slabs are heated therein to a predetermined average temperature. Thereafter, the slab is heated in heater B to a predetermined average temperature slightly higher than that set in the first heater, and the surface to center differential of the slab decreased. The third heater C further raises the peak surface temperature and further reduces the surface to center differential of the slab.

Figure 6:
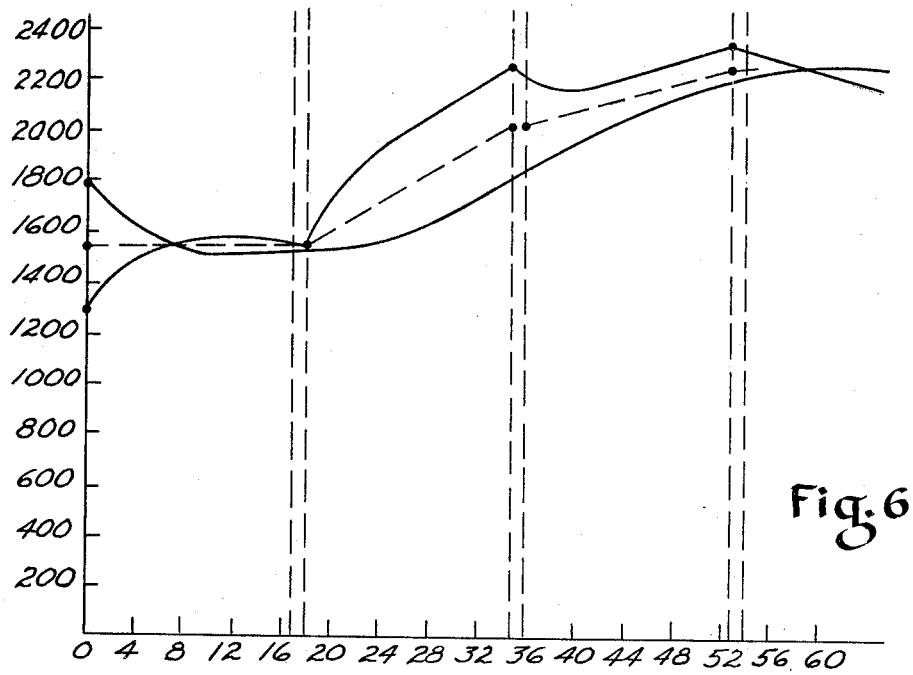
FIGURE 6 is a graph of the heating curve for stage heating of metal slab, the starting temperature indicated being that of a slab at casting temperature.
Figure 7:
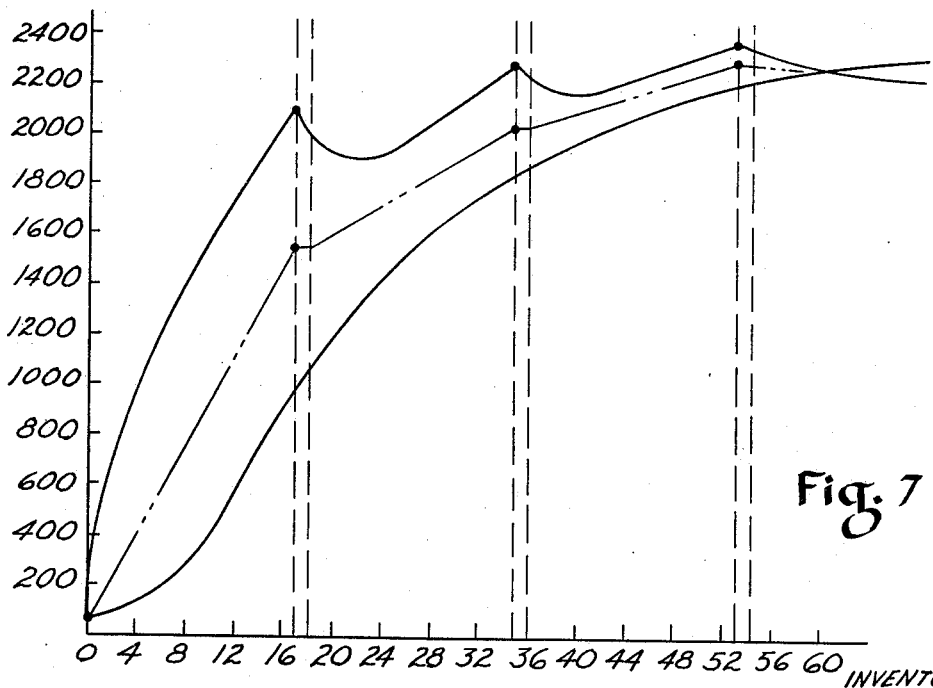
FIGURE 7 is a graph of the heating curve for stage heating a metal slab received at room temperature.

In the example used in FIGURES 6 and 7, the heating curves were derived by heating the slabs successively in heater A rated at 20,000 kw.; the second heater B rated at 10,000 kw. and the third heater C rated at 5,000 kw.

As shown in FIGURE 7, it will be noted that the surface temperature of the "cold" slab quickly raises in the first heater and a mean temperature is quickly established by the differential temperature between the surface and the center of the slab in the heating cycle approximating the temperature (1575°) of a slab as directly received from a casting operation and attained at the end of the first stage heating. If a "cold" slab is received (at room temperature) (see FIGURE 7) a relatively larger differential between surface and center of the slab occurs than when a slab is received from a casting operation (FIGURE 6).

In the second and third heating operation B and C of FIGURE 7, this differential is reduced until equalization at the end stage at selected maximum peak temperature, which in the form shown is preferably a mill selected rolling temperature, is approximately achieved. In the graph of FIGURE 6, the differential is enlarged in the second stage cycle B and reduced in the third stage heating cycle C. When the first heater A receives a slab at approximately cast temperature, the heater is cycled on and off by a proximity thermosensing means 102 to maintain this temperature and to deliver a slab to the second heater at the predetermined means. In the graphs, the time of heating the static load is shown as seventeen minutes, the transfer time one minute for each heater. The times while accurately described may vary due to holding times caused by mill delays, etc.

The first stage heater, it will be obvious could be eliminated when slabs to be heated are received at 1500 F., as when they are received directly from the casting machine. Normally slabs to be reheated in the heaters of this invention and received directly from the continuous casting installation have a normal surface temperature of 1300° F. and a center temperature of 1800° F. and the temperature gradients approximate a straight line condition resulting in an average slab temperature of 1500° F. (see FIGURE 6). If the slabs received are "cold" or have temperatures below 1500° F. average, the first heater is required. Hence the stage heaters employed are preferably three in number.

As shown in FIGURE 7, when a "cold" billet is processed, the initial heat coil increases the total slab temperature to an average of 1500° F. the predetermined peak temperature of the surface being approximately 2100° F. at power off-transfer time and the center temperature being approximately 900° F. The slabs as shown in FIGURES 6 and 7 which, in the example shown in the graphs of FIGURES 6 and 7 are 26 feet long and 12 inches thick, are processed in each of the heaters A, B, and C seventeen minutes and one minute is allowed for power-off transfer of each slab from one heater to the next, for pick up of a fresh slab and discharge of a completely heated slab from the final heater.

Various rates of power input and heating times may be utilized to meet production requirements for any slab size. The temperatures and times given herein are established for certain production and temperature rates required for slabs of particular dimensions. Other requirements might dictate a change in power input and heating times to produce at a faster or slower rate per line. The heating rate requirement for a slab is dictated largely by the thickness of the slab and thicker slabs than those of the example would necessitate a longer heating time.

It is to be noted that all of the heaters may simultaneously receive slabs aligned therewith and simultaneously discharge the same. Cycling on and off of power to maintain final preset average temperatures in each slab by the temperature control means 40 and simultaneous or sequential switching of power off for transfer and control means as well as for operating the hoist to raise or lower the same as desired is preferably associated with each and all of the heaters and may be manually or automatically controlled (see FIGURE 5) to ensure simultaneous or sequential movement of all slabs with respect to all heaters.

During transfer of a slab from the first to the second heater and from the second to the third heater a decrease in the maximum or surface temperature of the slab occurs. In the example shown, the peak surface temperature of 2100° F. attained by the slab in the first heater drops to approximately 1975° F. during the transfer time. The second inductor adds additional temperature to the slab, raising the surface to the preset 2275° F., the center to approximately 1825° F. and establishing an average of about 2050° F. During transfer from the second to the third induction heater, the surface temperature of the slab drops slightly and the center temperature raises slightly. In the third heater the peak surface temperature is shown at 2350° F. the center temperature at 2100° F. and the mean differential 2225° F., the slab stage heating facility providing a maximum surface to center differential of approximately 250° F. Therefore, a delay of approximately four minutes after discharge of the slab from the final heater and its delivery to the mill equalizes the temperature of the slab and represents an improvement in differential and uniformity.

Figure 5:
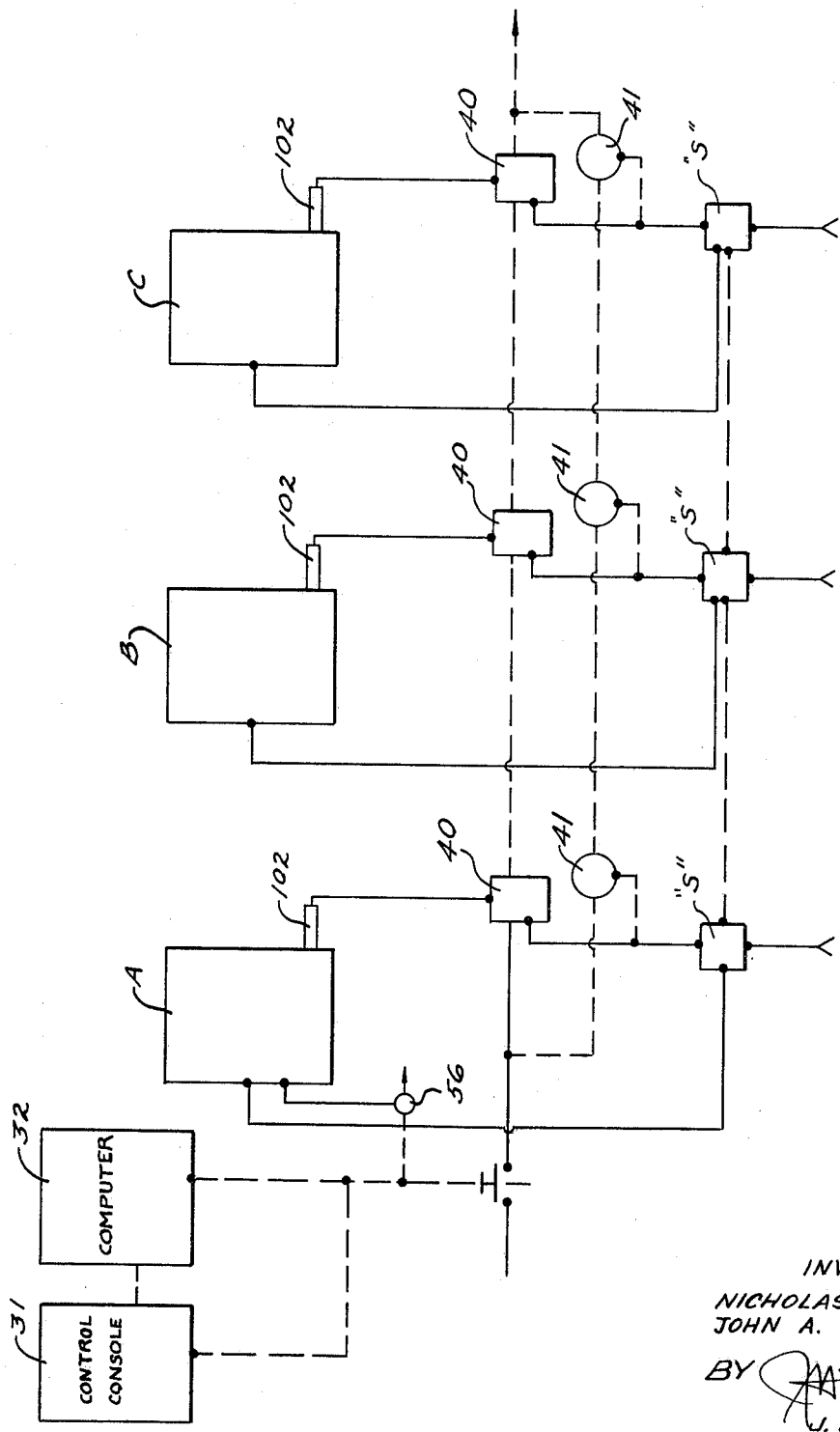
FIGURE 5 is a diagrammatic view of circuitry utilized in one form of the invention.

A control station 31 provided with power cycle controls, including power on-off and "hold" controls, a selector switch for slab widths, causing previously described preprogrammed series of events to take place manually or automatically operated by either the temperature control system or timer means or the like shown in FIGURE 5 to maintain the temperature of the slabs in each heater at the control setting lever therefor, obviously may be provided and suitable automation for control and record provided.

As shown in the circuitry in FIGURE 5 the proposed stage heating of the invention operates from a three phase supply of alternating current, supplying preferably single phase power rated at 20,000 mw., 10,000 mw., and 5,000 mw. to coils A, B, and C of the separate induction heaters of this invention. Each coil A, B, C, is connected as shown in FIGURE 5 to switches S wherefor the power thereto may be separately switched on and off as indicated in broken lines simultaneously switched on and off. The switches S are preferably of the silicon controlled rectifier solid state static contactory type but other switches such as manual switches may be used to turn on or off the power of the heating units as indicated by either the temperature control means 40 or timing means 41.

Computer means 32 well known in the art, as previously referred to may be employed to monitor, record, read out, control and automatically operate the stage heaters of this invention and may be located at a point remote from said heaters and sensing and detecting means 56 for ascertaining current, voltage, slab dimensions, slab positions, the temperatures of slabs, protective devices, demand and phase balance may be employed signalling both the operator and computer control to actuate appropriate adjustment and movement.

Whenever the mill requires a heated slab, the operator preferably presses a push button control 45 and if the slabs have reached their pre-set temperature the power to such heaters will be shut off, and the hoist lowered to deposit the slabs in appropriate slots, for example, in a transfer car T and the slab discharged from the last heater C will be furnished the mill. A number of heating lines involving stage heaters according to the invention can be used, the same being programmed to discharge a greater number of slabs sequentially to the mill and by proper scheduling and use of computer control, production demand peaks kept to a minimum. A single operator may easily operate a number of lines from a single station.

While the invention is described in connection with a preferred embodiment, it will be readily understood that numerous and extensive departures may be made therein without, however, departing from the spirit of the invention and the scope of the appended claims.

What we claim is:

1. Apparatus for heating metal slabs comprising a plurality of low frequency induction heater units, said heater units being disposed in spaced line relationship, the first of said heater units being of a higher power rating and subsequent heater units being of reduced power rating, means for simultaneously positioning metal slabs on edge within each of said heater units, means for simultaneously energizing said heaters to statically heat said slabs to predetermined different and successively higher temperatures within the said successive heater units, control means, means operated by said control means to simultaneously transfer said slabs on edge from one to another of said heaters, to receive a fresh slab and to discharge a slab heated to final selected temperature from the final heater unit in each cycle of operations.

2. Apparatus according to claim 1 wherein said heaters are disposed in each line of operation and a series of metal slabs of relatively greater length than width are sequentially placed in the heaters of the line, a said first heater heating the slab to a predetermined mean temperature during the first cycle, said second heater heating the so heated slab thereafter to a predetermined higher mean temperature and a third said heater heating said previously heated slab thereafter to a predetermined highest mean temperature, a fresh slab being admitted to the line upon discharge of each finally heated slab, one each of the three said slabs being simultaneously moved by lift means into heating position within one each of the three said heaters and simultaneously heated during each cycle of operation, said slabs being static during heat, the lowering of said lift means simultaneously withdrawing each of the slabs from their associated heater, and disposing the same in transfer means whereby a completely heated one of said slabs is discharged therefrom, two of the said partially heated slabs are simultaneouly moved into the second and third heaters from their previous positions within the said first and second heaters, respectively, and simultaneously therewith a fresh slab is positioned within the first said heater.

3. Apparatus for heating metal slabs according to claim 1, wherein said transfer means are operative to transfer the slabs positioned on edge therein.

4. Apparatus for heating a plurality of metal slabs comprising a plurality of vertically disposed induction heater units, means for conveying metal slabs from one of the said plurality of vertically disposed induction heater units to an induction heater unit in spaced relationship thereto, said means carrying a plurality of said slabs in spaced line relationship on edge therein wherefor each slab is brought into alignment with a separate heater unit, means lifting each of said slabs carried thereby simultaneously into each of said several induction heater units and disposing the slab on edge therein, the same being heated therein, said lift means removing the slabs simultaneously from said heaters, said apparatus transferring the said slabs into the next heater unit of the line.

5. Apparatus for heating metal slabs according to claim 1 including slab temperature sensing means adapted to detect slab temperature and to signal said control means.

6. Apparatus according to claim 1 wherein said induction heater units are disposed in equidistant spaced line relationship, and wherein said means to simultaneously transfer said slabs from one to another of said heaters consist of lift means under each heater and a common carriage for all slabs being processed through the line, said lift means first lowering all slabs simultaneously from within said heaters onto said common carriage, said common carriage then travelling forward for the exact distance between two heaters, said lift means then raising all slabs simultaneously into said subsequent heaters, and said carriage thereafter reversing to its original position.

7. Apparatus for electrically inductively heating metal slabs which are required to be delivered to a mill at mill working temperatures, said slabs being delivered in synchronism with a predetermined working cycle by a slab hoist and a slab support to an inductor located in alignment with said hoist and support, said slab being set on edge vertically within the said inductor and maintained on edge until said slab reaches a predetermined temperature, temperature sensing means controlling power to said inductor and signalling control means located remotely thereto, said hoist lowering said slab vertically out of said inductor and out of alignment with the inductor to permit another slab to be transported on edge into said inductor.

References Cited

UNITED STATES PATENTS

| | | | |
|---|---|---|---|
| 2,400,472 | 5/1946 | Strickland | 219—10.41 |
| 2,787,692 | 4/1957 | Braeuninger et al. | 219—10.41 |
| 2,852,650 | 9/1958 | DeCoriolis et al. | 219—10.67 |
| 2,858,405 | 10/1958 | Kimbrough et al. | 219—10.67 |
| 2,859,323 | 11/1958 | McArthur et al. | 219—10.41 |
| 2,988,623 | 6/1961 | Ross et al. | 219—10.41 |
| 3,291,954 | 12/1966 | Scheffler | 219—10.71 |

JOSEPH V. TRUHE, Primary Examiner

L. H. BENDER, Assistant Examiner

U.S. Cl. X.R.

219—10.57, 10.69